(12) United States Patent
Rosman et al.

(10) Patent No.: US 11,999,356 B2
(45) Date of Patent: Jun. 4, 2024

(54) COGNITIVE HEAT MAP: A MODEL FOR DRIVER SITUATIONAL AWARENESS

(71) Applicant: TOYOTA RESEARCH INSTITUTE, INC., Los Altos, CA (US)

(72) Inventors: Guy Rosman, Newton, MA (US); Simon A. I. Stent, Cambridge, MA (US); Luke Fletcher, Cambridge, MA (US); John Leonard, Newton, MA (US); Deepak Gopinath, Chicago, IL (US); Katsuya Terahata, Nisshin (JP)

(73) Assignee: Toyota Research Institute, Inc., Los Altos, CA (US)

( * ) Notice: Subject to any disclaimer, the term of this patent is extended or adjusted under 35 U.S.C. 154(b) by 410 days.

(21) Appl. No.: 17/351,611

(22) Filed: Jun. 18, 2021

(65) Prior Publication Data
US 2022/0153278 A1 May 19, 2022

Related U.S. Application Data

(60) Provisional application No. 63/113,454, filed on Nov. 13, 2020.

(51) Int. Cl.
*B60W 40/08* (2012.01)
*G06N 3/045* (2023.01)
(Continued)

(52) U.S. Cl.
CPC ............. *B60W 40/08* (2013.01); *G06N 3/045* (2023.01); *G06V 20/597* (2022.01); *G06V 40/19* (2022.01); *B60W 2420/403* (2013.01)

(58) Field of Classification Search
CPC ......... B60W 40/08; B60W 2040/0818; B60W 2540/225; G06N 3/045; G06V 20/597; G06V 40/18
See application file for complete search history.

(56) References Cited

U.S. PATENT DOCUMENTS 7,884,705 B2   2/2011   Nishimura et al.
9,747,812 B2   8/2017   Misu
(Continued)

FOREIGN PATENT DOCUMENTS

JP         5120249 B2    1/2013
WO    2002080127 A1    10/2002
(Continued)

OTHER PUBLICATIONS

On Generalizing Driver Gaze Zone Estimation Using Convolutional Neural Networks (http://swiftlet.ucsd.edu/publications/2017/IV2017-VoraTrivedi-OnGeneralizingGazeZone.pdf), accessed Jun. 11, 2017.
(Continued)

*Primary Examiner* — Jonathan L Sample
*Assistant Examiner* — Mohammed Yousef Abuelhawa
(74) *Attorney, Agent, or Firm* — Dinsmore & Shohl LLP

(57) ABSTRACT

A system includes a camera configured to capture image data of an environment, a monitoring system configured to generate a gaze sequences of a subject, and a computing device communicatively coupled to the camera and the monitoring system. The computing device is configured to receive the image data from the camera and the gaze sequences from the monitoring system, implement a machine learning model comprising a convolutional encoder-decoder neural network configured to process the image data and a side-channel configured to inject the gaze sequences into a decoder stage of the convolutional encoder-decoder neural network, generate, with the machine learning model, a gaze probability density heat map, and generate, with the machine learning model, an attended awareness heat map.

20 Claims, 7 Drawing Sheets

(51) Int. Cl.
*G06V 20/59* (2022.01)
*G06V 40/19* (2022.01)

(56) References Cited

U.S. PATENT DOCUMENTS

| | | | |
|---|---|---|---|
| 10,296,794 B2 | 5/2019 | Ratti | |
| 10,768,304 B2 | 9/2020 | Englard et al. | |
| 10,769,456 B2 | 9/2020 | Sathyanarayana et al. | |
| 2015/0339589 A1* | 11/2015 | Fisher | G06V 10/454 706/12 |
| 2017/0278417 A1 | 9/2017 | Ur et al. | |
| 2018/0012085 A1 | 1/2018 | Blayvas et al. | |
| 2018/0191952 A1* | 7/2018 | Ardo | H04N 21/2662 |
| 2018/0225554 A1 | 8/2018 | Tawari et al. | |
| 2018/0322715 A1 | 11/2018 | Toyoda et al. | |
| 2019/0236386 A1 | 8/2019 | Yu et al. | |
| 2019/0279009 A1 | 9/2019 | Srirangam Narashiman et al. | |
| 2019/0317594 A1* | 10/2019 | Stent | G06V 10/143 |
| 2019/0346844 A1 | 11/2019 | Chen et al. | |
| 2020/0130578 A1 | 4/2020 | Murakami | |
| 2020/0210765 A1* | 7/2020 | Chinni | G06V 10/764 |
| 2020/0284912 A1 | 9/2020 | Bush et al. | |
| 2020/0342303 A1 | 10/2020 | Stent | |
| 2020/0379460 A1 | 12/2020 | Stent | |
| 2022/0121867 A1* | 4/2022 | Arar | G06V 20/588 |

FOREIGN PATENT DOCUMENTS

| | | | |
|---|---|---|---|
| WO | 2020006154 A2 | 1/2020 | |
| WO | WO-2020122986 A1 * | 6/2020 | B60Q 9/00 |

OTHER PUBLICATIONS

Deep Learning for Distracted Driving Detection (https://www.nauto.com/blog/nauto-engineering-deep-learning-for-distracted-driver-monitoring), accessed Feb. 18, 2020.
Predicting the driver's focus of attention: the dr(eye)ve project URL: https://arxiv.org/pdf/1705.03854.pdf, accessed Dec. 10, 2020.

* cited by examiner

COGNITIVE HEAT MAP: A MODEL FOR DRIVER SITUATIONAL AWARENESS

CROSS-REFERENCE TO RELATED APPLICATIONS

This application claims priority to U.S. Provisional Application No. 63/113,454 filed Nov. 13, 2020, the disclosure of which is incorporated herein by reference in its entirety.

TECHNICAL FIELD

The present specification generally relates to systems and methods for estimating a person's awareness of a scene, and more specifically, to systems and methods implementing a computational model which estimates a person's attended awareness of the environment from noisy gaze measurements.

BACKGROUND

Estimation of a person's awareness of objects in the scene around them based on their gaze is an important input for many applications of human-machine interfacing, such as in the context of automated driver assistance systems and semi-autonomously or autonomously controlled vehicles. However, estimating attended awareness through the implementation of sensors and computing devices configured to analyze sensor signals until now has been a challenging task. As such, there is a need to provide systems and methods configured to accurately estimate the attended awareness of an environment from sensor inputs.

SUMMARY

In embodiments, a system includes a camera configured to capture image data of an environment, a monitoring system configured to generate a gaze sequences of a subject, and a computing device communicatively coupled to the camera and the monitoring system. The computing device is configured to receive the image data from the camera and the gaze sequences from the monitoring system, implement a machine learning model comprising a convolutional encoder-decoder neural network configured to process the image data and a side-channel configured to inject the gaze sequences into a decoder stage of the convolutional encoder-decoder neural network, generate, with the machine learning model, a gaze probability density heat map, and generate, with the machine learning model, an attended awareness heat map.

In some embodiments, a method includes receiving image data of an environment from a camera and gaze sequences of a subject from a monitoring system, implementing, with a computing device, a machine learning model comprising a convolutional encoder-decoder neural network configured to process the image data and a side-channel configured to inject the gaze sequences into a decoder stage of the convolutional encoder-decoder neural network, generating, with the machine learning model, a gaze probability density heat map, and generating, with the machine learning model, an attended awareness heat map.

In some embodiments, a vehicle includes a camera configured to capture image data of an environment around the vehicle, a monitoring system configured to generate a gaze sequences of a driver, and a computing device communicatively coupled to the camera and the monitoring system. The computing device is configured to receive the image data from the camera and the gaze sequences from the monitoring system, implement a machine learning model comprising a convolutional encoder-decoder neural network configured to process the image data and a side-channel configured to inject the gaze sequences into a decoder stage of the convolutional encoder-decoder neural network, generate, with the machine learning model, a gaze probability density heat map, and generate, with the machine learning model, an attended awareness heat map.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8A-1 depicts a first frame in a video snippet depicting a gaze probability density heat map, according to one or more embodiments shown and described herein;

FIG. 8B-1 depicts a second frame in the video snippet depicting the gaze probability density heat map, according to one or more embodiments shown and described herein;

FIG. 8C-1 depicts a third frame in the video snippet depicting the gaze probability density heat map, according to one or more embodiments shown and described herein;

FIG. 8A-2 depicts a first frame in a video snippet depicting an attended awareness heat map corresponding to the gaze probability density heat map depicted in FIG. 8A-1, according to one or more embodiments shown and described herein;

FIG. 8B-2 depicts a second frame in the video snippet depicting the attended awareness heat map corresponding to the gaze probability density heat map depicted in FIG. 8B-1, according to one or more embodiments shown and described herein; and FIG. 8C-2 depicts a third frame in the video snippet depicting the attended awareness heat map corresponding to the gaze probability density heat map depicted in FIG. 8C-1, according to one or more embodiments shown and described herein.

DETAILED DESCRIPTION

Figure 1:
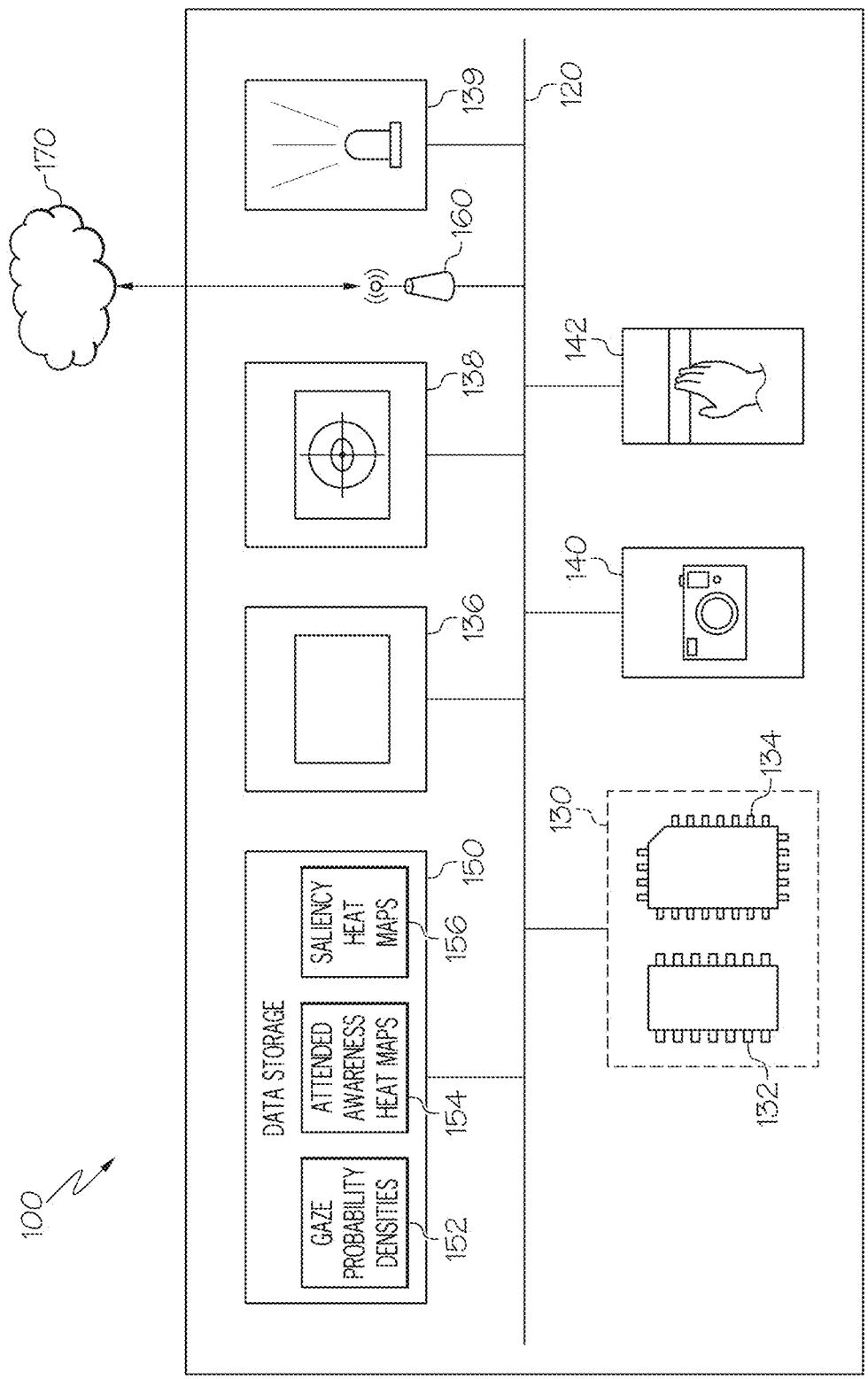
FIG. 1 depicts an illustrative system for estimating the attended awareness of a subject with respect an environment, according to one or more embodiments shown and described herein.

Systems and methods implementing computational models designed to estimate a person's awareness of their environment from noisy measurements of their gaze are described herein. Additionally, the systems and methods include the ability to reason over possible modes of visual task attention. For example, in the context of driving, which is a potentially safety-critical domain where being able to estimate the attended visual attention of a driver might allow a vehicle to provide more effective ahead-of-time warnings with the systems and methods are disclosed herein.

The processes of human visual attention, scene understanding, and decision-making are linked, but implementing an understanding of the linkages and predicting them from sensor data has been an elusive goal for computational models. The present disclosure describes models capable of estimating a salient heat map, a refined gaze estimation, and an estimate of a subject's attended awareness of an environment from input image data (e.g., video of a scene) and captured gaze sequences of the subject. As used herein, "attended awareness" or "awareness" refers to the awareness of an environment that a human acquires through overt attention to it. Attended awareness can be associated with defined regions with in an environment, such as by salient location, and may be temporal. That is, a core cognitive function of humans is visual working memory, which refers to the way humans perceive the identity of objects and perceive where objects are located in space at any given point in time to help focus attention. Additionally, there is a capacity aspect to one's visual working memory. As such, attended awareness for a specific region of an environment may increase or decrease over time depending on a subject's visual working memory capacity and the frequency and/or duration in which they observe the specific region of an environment.

Captured gaze sequences are inherently noisy due to the sensor systems employed to generate the gaze sequences. For example, noise may be introduced from signal processing in the monitoring system and/or biases due to calibration errors in the monitoring system. Noisy gaze sequences can lead to poor estimates of gaze. Accordingly, the systems and methods described herein further provide processes for the refinement of noisy and/or biased gaze sequences by leveraging visual saliency of a scene the subject is viewing.

As described in more detail herein, embodiments relate to situational awareness, visual saliency estimation, and driving. The notion of situational awareness (SA) can be traced back to the pilots of World War I, who sought to operationalize their own abilities to respond in a timely manner to environmental threats. Perhaps the most widely used model for SA divides the task up into three levels of increasing complexity: perception (the search for and perception of new, relevant information), comprehension (the integration of new information with existing information to form a task-specific picture of the world) and projection (the extrapolation of world states in time to inform decision-making).

Present embodiments focus on perception, with an aim to model, from noisy observations of a person's fixations, the set of objects and scene structures, which that person is likely to have attended to, and therefore might be better able to incorporate into their future decision making. It is noted that while peripheral vision is capable of sufficient perception to achieve SA in many settings, embodiments more specifically focus on objects of fixation, since one goal relates to estimating when drivers fail to notice driving hazards, which are known to strongly induce fixations. Some attempts have been made to computationally model SA, however, the present embodiments are unique in that they explicitly estimate the parts of the visual scene to which a person has attended using a spatiotemporal model for gaze and scene understanding.

For example, driving is a predominantly visual task. Certain driving behaviors such as the "perceptual narrowing" effect in which drivers increasingly fixate on the road ahead as task demands increase (e.g. through greater speed, increased traffic or lack of familiarity with a route), or the benefits of understanding driver attention when predicting a driver's future intent have been studied. However, no models exist with the purpose of quantitatively estimating a driver's spatial awareness of a scene. Accordingly, the machine learning model presented herein makes it possible to simultaneously estimate scene saliency, a denoised gaze signal, and an estimate of the driver's overall awareness of the scene. That is, a model that learns saliency as a component of a larger system for understanding driver attention and predicting task behavior is presented herein. Additionally, learning video saliency from human gaze using candidate selection is also disclosed. Embodiments of the present disclosure propose three sources of candidates: static, motion, and semantic (including constant size center bias candidate), which may be conditioned on prior masks.

Embodiments include a system that receives external imagery of an environment around a vehicle and gaze sequence data from a monitoring system such as a driver monitoring system (DMS). The external imagery may be captured by cameras positioned along the side of, in front of, on top of, or behind the vehicle. For example, the DMS may include infrared sensors and cameras to monitor driver attentiveness and gaze through eye tracking. The DMS provides an estimate (albeit likely a noisy signal) on where the driver may be looking.

The external imagery data is processed with a neural network configured to identify visually salient regions in the environment in combination with the gaze sequences. Visually salient regions may indicate areas in an environment where a driver should direct some attention. Once the system makes a determination of an area of interest in the environment, the system estimates where the driver is looking based on the DMS data, and determines whether the driver is aware of visually salient regions in the environment. In some embodiments, the determination of whether the driver has looked at an area of interest may include a temporal aspect that determines if the driver has looked at the visually salient regions in the environment in the recent past.

The system's determination of whether or not the driver has looked at a portion of the image may be used by an Advanced Driver Assistance System (ADAS) or similar system to provide more informative alerts, responses, and/or activation of more or less assistive control depending on whether the driver is alert and aware of occurrences in an environment as perceived through the external imagery. The issue of understanding awareness is also important in partially automated (e.g., Level 2 or Level 3) driving, where it is known that removing physical control and decision-making responsibility from drivers can lead to a reduced propensity to efficiently scan the environment for information relevant to unexpected control handbacks, for example.

Some embodiments of the system also include the ability for the system to interpret the gaze signal with respect to different driver modes. That is, the gaze signal from a DMS may be used to determine whether the driver is alert or not alert (e.g., based on whether the driver's eyes are directed towards a phone or road, whether the driver is engaging in a heated conversation, whether the driver is talking on the phone, and the like). The system may implement further assistive controls or alerts should the driver be determined to be in an altered state of mind.

Embodiments of the present disclosure are directed to systems and methods that utilize image data of an environment and gaze sequence data to determine an attended awareness and recognition of aspects and/or events in the environment by a subject, such as a driver of a vehicle. The systems and methods described herein implement a machine learning model that estimates attended awareness of a subject with respect to an environment. The following will now describe these systems and methods in detail with reference to the drawings and where like number refer to like structures.

Turning now to FIG. 1, a system 100 for estimating the attended awareness of a subject with respect to an environment is depicted. The system 100 may include a computing device 130. The computing device 130 may include a processor 132 and a memory component 134. The system 100 may also include a communication bus 120, a display device 136, a monitoring system 138 (e.g., a gaze-tracking system or a driver monitoring system), an illuminating device 139, one or more cameras 140, a data storage component 150 and/or network interface hardware 160. The system 100 may be communicatively coupled to a network 170 by way of the network interface hardware 160. The components of the system 100 are communicatively coupled to each other via the communication bus 120. The various components of the system 100 and the interaction thereof will be described in detail below.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors 132, memories, sensors, input devices, output devices, and communication devices. Accordingly, the communication bus 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication bus 120 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The computing device 130 may be any device or combination of components comprising a processor 132 and the memory component 134. The processor 132 of the system 100 may be any device capable of executing the machine-readable instruction set stored in the memory component 134. Accordingly, the processor 132 may be an electric controller, an integrated circuit, a microchip, a field programmable gate array, a computer, or any other computing device. The processor 132 is communicatively coupled to the other components of the system 100 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. While the embodiment depicted in FIG. 1 includes a single processor 132, other embodiments may include more than one processor 132.

The memory component 134 of the system 100 is coupled to the communication bus 120 and communicatively coupled to the processor 132. The memory component 134 may be a non-transitory computer readable memory and may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as machine language that may be directly executed by the processor 132, or assembly language, object-oriented programming (OOP), scripting languages, microcode, etc., that may be compiled or assembled into machine readable instructions and stored in the memory component 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the system 100 depicted in FIG. 1 includes a single memory component 134, other embodiments may include more than one memory components 134.

Still referring to FIG. 1, the system 100 includes a display device 136 for providing a visual output, for example, a visualization of a gaze probability density heat map, an attended awareness heat map, or a visual saliency heat map. The display device 136 is coupled to the communication bus 120. Accordingly, the communication bus 120 communicatively couples the display device 136 with other modules of the system 100. The display device 136 may include any medium capable of transmitting an optical output such as, for example, a cathode ray tube, light emitting diodes, a liquid crystal display, a plasma display, or the like. Additionally, the display device 136 may be the display device 136 of a portable personal device such as a smart phone, tablet, laptop or other electronic device. Additionally, it is noted that the display device 136 can include one or more processors 132 and one or more memory components 134. While the system 100 includes a display device 136 in the embodiment depicted in FIG. 1, the system 100, may not include a display device 136.

The display device 136 may also include one or more input devices. The one or more input devices may be any device capable of transforming user contact into a data signal that can be transmitted over the communication bus 120 such as, for example, a button, a switch, a knob, a microphone or the like. In some embodiments, the one or more input devices include a power button, a volume button, an activation button, a scroll button, or the like. The one or more input devices may be provided so that the user may interact with the display device 136, such as to navigate menus, make selections, set preferences, and other functionality described herein. In some embodiments, the input device includes a pressure sensor, a touch-sensitive region, a pressure strip, or the like. It should be understood that some embodiments may not include the input device.

The system 100 may include a monitoring system 138 (e.g., which may also be referred to as a gaze-tracking system or a driver monitoring system) for tracking an eye or gaze direction of a subject to generate gaze sequences, for example, defined by gaze direction vectors indicating where a subject is gazing. The monitoring system 138 may include one or more cameras 140 and/or an array of infrared light detectors positioned to view one or more eyes of a subject and/or the head position of the subject. The monitoring system 138 may also include or be communicatively coupled to an illuminating device 139 which may be an infrared or near-infrared light emitter. The illuminating device 139 may emit infrared or near-infrared light, which may be reflected off a portion of the eye creating a profile that is more readily detectable than visible light reflections off an eye for eye-tracking purposes.

The monitoring system 138 may be spatially oriented in an environment and generate gaze sequences (e.g., over a period of time). One of a variety of coordinate systems may be implemented, for example, a user coordinate system (UCS) may be used. For example, the UCS has its origin at the center of the front surface of the gaze-tracker. With the origin defined at the center of the front surface (e.g., the eye-tracking camera lens) of the monitoring system 138, a gaze direction vector may be defined with respect to the location of the origin. Furthermore, when spatially orienting the monitoring system 138 in the environment, all other objects including the one or more cameras 140 may be localized with respect to the location of the origin of the monitoring system 138. In some embodiments, an origin of the coordinate system may be defined at a location on the subject, for example, at a spot between the eyes of the subject. Irrespective of the location of the origin for the coordinate system, a calibration process may be employed by the monitoring system 138 to calibrate a coordinate system for collecting gaze-tracking data for training the neural network.

Still referring to FIG. 1, the system 100 may include one or more cameras 140. The one or more cameras 140 may be communicatively coupled to the communication bus 120 and to the computing device 130. The one or more cameras 140 may be any device having an array of sensing devices (e.g., pixels) capable of detecting radiation in an ultraviolet wavelength band, a visible light wavelength band, or an infrared wavelength band. The one or more cameras 140 may have any resolution. The one or more cameras 140 may be an omni-directional camera, or a panoramic camera. In some embodiments, one or more optical components, such as a mirror, fish-eye lens, or any other type of lens may be optically coupled to each of the one or more cameras 140.

Figure 2:
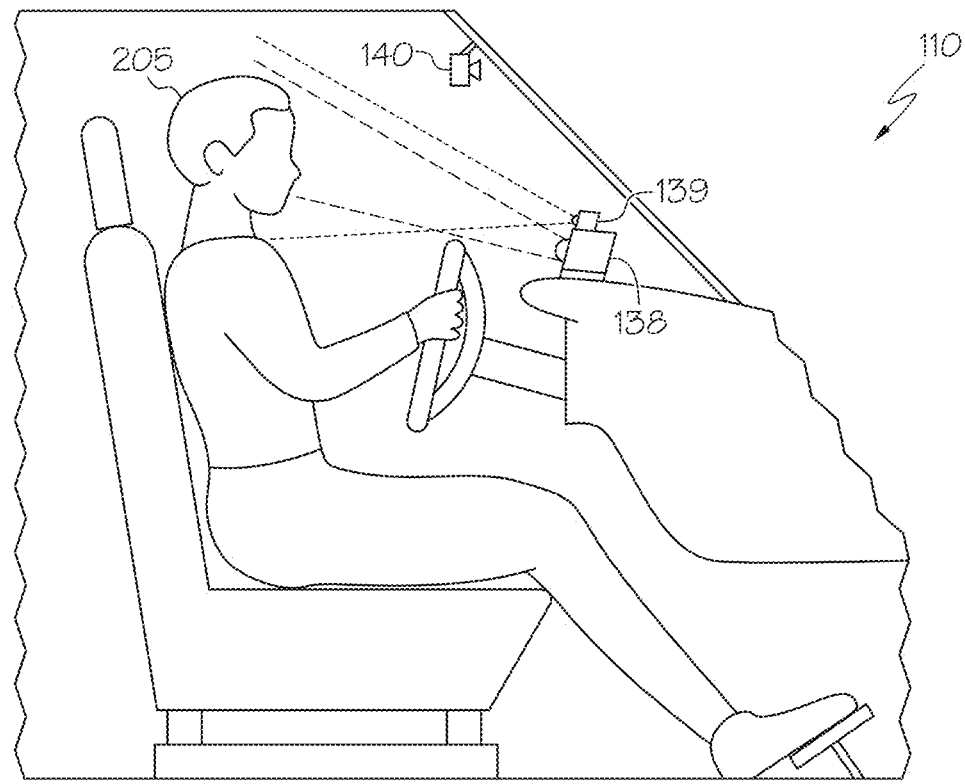
FIG. 2 depicts an illustrative vehicle environment implementing the system depicted in FIG. 1, according to one or more embodiments shown and described herein.

In embodiments described herein, the one or more cameras 140 may capture image data including video of an environment of a vehicle. The image data may be a sequence of images captured at a frequency within a predefined period of time. With reference to FIG. 2, a vehicle 110 may include one or more cameras 140 mounted thereon. The one or more cameras 140 may be mounted on a dashboard of a vehicle 110, on a rearview mirror, or elsewhere on the vehicle 110 such that the one or more cameras 140 may capture image data of the environment around a vehicle 110. The monitoring system 138 and optionally an illuminating device 139 may be configured within the vehicle 110 to capture the eye and head movements of a subject 205.

The system 100 further includes a data storage component 150 that is communicatively coupled to the system 100 and may be a volatile and/or nonvolatile digital storage component and, as such, may include random access memory (including SRAM, DRAM, and/or other types of random access memory), flash memory, registers, compact discs (CD), digital versatile discs (DVD), and/or other types of storage components. The data storage component 150 may reside local to and/or remote from the system 100 and may be configured to store one or more pieces of data (e.g., gaze probability density heat maps 152, attended awareness heat maps 154, and/or visual saliency heat maps 156) for access by the system 100 and/or other components or systems.

The system 100 may also include network interface hardware 160 that is communicatively coupled to the computing device 130 via the communication bus 120. The network interface hardware 160 may include any wired or wireless networking hardware, such as a modem, LAN port, Wi-Fi card, WiMax card, mobile communications hardware, and/or other hardware for communicating with a network and/or other devices and systems. For example, the system 100 may be communicatively coupled to a network 170 by way of the network interface hardware 160.

Figure 3:
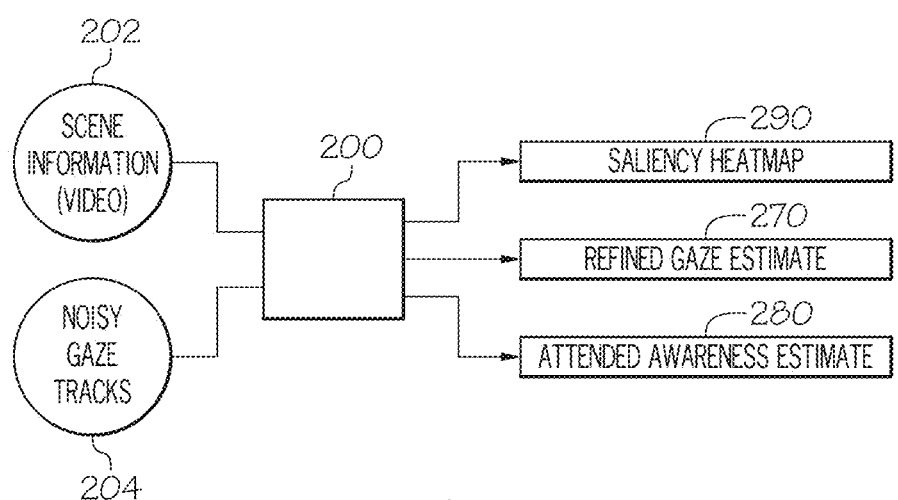
FIG. 3 depicts an illustrative input-output diagram of the machine learning model, according to one or more embodiments shown and described herein.

An illustrative input-output diagram of the machine learning model 200 is depicted in FIG. 3. As used herein, the term "machine learning model" refers to one or more mathematical models that are configured to find patterns in data and apply the determined pattern to new data sets to form a prediction. Different approaches, also referred to as categories of machine learning, are implemented depending on the nature of the problem to be solved and the type and volume of data. Categories of machine learning models include, for example, supervised learning, unsupervised learning, reinforcement learning, deep learning or a combination thereof.

Supervised learning utilizes a target or outcome variable such as a dependent variable which is to be predicted from a given set of predictors also referred to as an independent variable. These sets of variables are used to generate a function that maps labeled inputs to desired outputs. The training process is iterative and continues until the model achieves a desired level of accuracy on the training data. Machine learning models categorized as supervised learning algorithms and models include, for example, a neural network, regression, decision tree, random forest, k-nearest neighbors (kNN), logistic regression, or the like.

Unsupervised learning, unlike supervised learning, is a learning algorithm that does not use labeled data, thereby leaving it to determine structure from the inputs. In other words, the goal of unsupervised learning is to find hidden patterns in data through methods such as clustering. Some examples of unsupervised learning include Apriori algorithms or K-means. Reinforcement learning refers to machine learning models that are trained to make specific decisions. The machine learning model is exposed to an environment where it trains itself continually using trial and error. Such a model learns from experience and tries to capture the best possible knowledge to make accurate business decisions. An example of reinforcement learning includes Markov decision process.

Deep learning is a method of machine learning that incorporates neural networks in successive layers to learn from data in an iterative manner. Deep learning can learn patterns from unstructured data. Deep learning algorithms perform a task repeatedly and gradually improve the outcome through deep layers that enable progressive learning. Deep learning can include supervised learning or unsupervised learning aspects. Some deep learning machine learning models are, for example, artificial neural networks (ANNs), convolutional neural networks (CNNs), recurrent neural networks (RNNs), long short-term memory/gated recurrent unit (GRU), self-organizing map (SOM), autoencoders (AE), and restricted Boltzman machine (RBM).

A machine learning model is understood as meaning any variety of mathematical model having at least one non-linear operation (e.g., a non-linear activation layer in the case of a neural network). A machine learning model is trained or optimized via minimization of one or more loss functions (e.g., minimization of cross entropy loss or negative log-likelihood) that are separate from the model itself. A training or optimization process seeks to optimize the model to reproduce a known outcome (low bias) as well as enabling the model to make accurate predictions from unseen experiences (low variance). The model's output may be any variety of things relevant to the task such as a predicted value, a classification, a sequence, or the like. In the present embodiments, the output may be clearance values and/or confidence levels associated with the predicted clearance values.

The system 100, described with reference to FIG. 1, may be configured to implement a machine learning model 200, illustrated in FIG. 4, that receives image data 202, for example, in the form of video of an environment from a camera 140 along with noisy gaze sequences 204 generated by a monitoring system 138 of a subject. The machine learning model 200, implementing one or more convolutional models, processes the image data 202 and the noisy gaze sequences 204 to generate attended awareness heat maps 280 (also referred to herein as attended awareness estimate), gaze probability density heat maps 270 (also referred to herein as refined gaze estimate), and a saliency heat map 290. By explicitly estimating a person's awareness from noisy estimates of their gaze, the machine learning model 200 can improve human-machine interactions. For example, in the driving example, such interactions might include safety warnings when driver awareness is deemed insufficient. The machine learning model 200 will now be described in detail with reference to FIG. 4.

Figure 4:
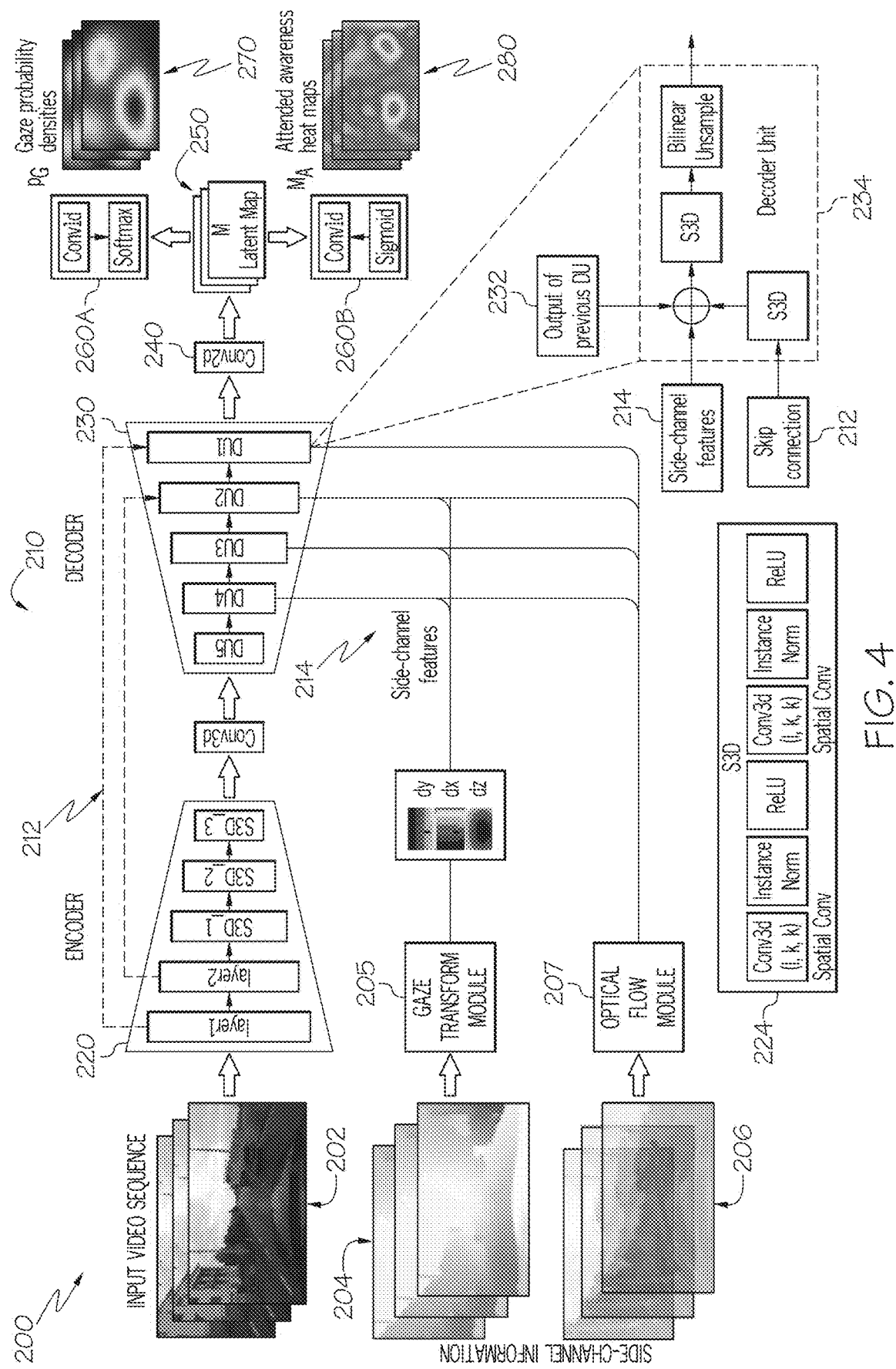
FIG. 4 depicts an illustrative block diagram of the machine learning model, according to one or more embodiments shown and described herein.

FIG. 4 depicts an illustrative block diagram of the architecture of the machine learning model 200 configured to estimate a person's awareness of their environment from noisy measurements of their gaze. The construction of the machine learning model 200 is driven by axiomatic considerations that define an image translation network from the scene image into two output heat maps. The heat maps provide an estimate of where the person could be looking (e.g., improving gaze information) and an estimate as to what the subject has observed. More generally, the trained machine learning model 200 described herein, affords estimation of attended awareness based on noisy gaze estimates and scene video over time. The trained machine learning model 200 additionally affords saliency estimation as well as the refinement of a noisy gaze signal.

The machine learning model 200 receives as inputs, the scene the person is observing in the form of image data 202 and a noisy estimate of the person's gaze in the form of gaze sequences 204. The image data 202 may be a video stream or video clip of an environment captured by a camera 140 (FIGS. 1 and 2) communicatively coupled to the computing device 130 (FIGS. 1 and 2) implementing the machine learning model 200. The gaze sequences 204 may be captured by a monitoring system 138 (FIGS. 1 and 2) that is communicatively coupled to the computing device 130 (FIGS. 1 and 2) implementing the machine learning model 200. In some embodiments, the machine learning model 200 may also receive optical flow estimates 206 computed from the image data 202, which may be encoded as two feature layers for horizontal and vertical motion by an optical flow module 207. In some embodiments, a one-shot vector representing a task the subject is engaged in may be injected into machine learning model 200. The one-shot vector may influence the weighting of the network's nodes to address features such as the decay weighting of an attended awareness heat map or the like.

The machine learning model 200 includes a convolutional encoder-decoder neural network 210. The convolutional encoder-decoder neural network 210 is trained to take as input image data 202, for example in the form of a video sequence with associated gaze sequences 204 from a monitoring system and optionally optical flow estimates 206. The video sequence is processed using the convolutional encoder-decoder neural network 210. In embodiments, the convolutional encoder-decoder neural network 210 generates a latent map 250, which is subsequently processed by separate convolutional models 260A and 260B to generate a gaze probability density heat map 270, ($P_G$), and an attended awareness heat map 280, ($M_A$). In other words, sensor image data 202 is encoded and decoded into a latent feature map, $M(x, t)$, from which two convolutional modules 260A and 260B emit the estimated gaze probability density heat map 270, ($P_G$), and an attended awareness heat map 280, ($M_A$), respectively.

The machine learning model 200 is guided by several assumptions related to human attended awareness and its relation to gaze patterns. These assumptions are implemented through a mixture of explicit objectives and behavioral regularization. Several assumptions about gaze patterns and attended awareness define the priors in training the machine learning model 200. For example, the assumptions about gaze patterns and attended awareness are categorized as the following: saliency, attended awareness, awareness decay, regularity of gaze and awareness, and awareness and motion. Saliency refers to the assumption that gaze tends to focus on specific regions, for example salient regions in an environment. Vision scientists have long sought to model and understand the mechanisms behind our allocation of attention in a visual scene. Visual salience is a function of many factors, including the spatiotemporal nature of the stimulus itself as well as its relationship to neighboring stimuli and the nature of the visual system perceiving it.

In embodiments discussed herein, a 3D CNN-based approach is adopted, which has proven successful on other video understanding tasks such as action recognition. Additionally, the dataset used for training the machine learning model 200 is based on multiple subjects observing the same visual stimuli under different cognitive task modifiers. The dataset therefore allows for reasoning about the effect of different cognitive task modifiers on the visual gaze patterns, given identical visual input. Additionally, annotations are provided for third party estimates of a subject's attended awareness based on observations of their scan path. The scan path (gaze sequences) are gathered using a high precision gaze tracker with a chin rest such that the precision of the scan paths is extremely high when compared to that of eye-glass gaze tracking datasets. Attended awareness is the assumption that people tend to become aware of the objects they look at. However, their attention is limited in its capacity. Accordingly, awareness of an object can decrease (due to forgetting), or increase (when looking at an object) at different rates. This is referred to as awareness decay. Furthermore, it is assumed that gaze and awareness maps should be regular and smooth unless otherwise warranted. Terms are included in the machine learning model 200 to account for the regularity of gaze and awareness. Furthermore, with regards to awareness and motion, as an observer moves through a dynamic scene, their awareness moves along with objects and regions in the scene and exhibits temporal persistence. Each of the aforementioned assumptions guides the design of the loss function of the machine learning model 200.

Still referring to FIG. 4, the convolutional encoder-decoder neural network 210 includes encoder layers 220 and decoder layers 230. The convolutional encoder-decoder neural network 210 may also include skip connections 212 that link one or more encoder layers 220 directly to one or more decoder layers 230. A skip connection 212 provides an alternative path for a gradient with backpropagation. These additional paths are often beneficial for model convergence. Skip connections 212 in deep architectures, as the name suggests, skip some layers in the neural network and feed the output of one layer as the input to the next layers instead of only the next one.

The decoder layers 230 include stacked decoder units (DU1-DU5) 234 each of which receives input from three sources a) side-channel information 214 b) skip connections 212 from the encoder layer 220 and c) the output of the previous decoder unit 232, when available. Each decoder unit 234 consists of two submodules. The skip connections 212 are first processed via separable 3D convolution modules 224 denoted as S3D whose output is then concatenated (channel-wise) with the side-channel information 214 and the output of the previous decoder unit 232. This concatenated input is processed by another S3D module followed by bilinear upsampling that brings the output to the proper resolution for the next decoder unit 234.

Side-channel information 214 includes gaze sequences 204 and optionally optical flow 206 that are transformed and injected into the decoder layers 230 of the convolutional encoder-decoder neural network 210.

The decoder layers 230 emit a latent map 250, M, which is subsequently processed by two separate convolutional models 260A and 260B to emit a gaze probability density heat map 270, $P_G$, and an attended awareness heat map 280 denoted as $M_A$, respectively. In some embodiments, the output of the convolutional encoder-decoder neural network 210 is processed by a conv2d layer 240, which helps produce a tensor of outputs, for example, the latent map 250, M. Additionally, the softmax in the gaze convolutional module 260A ensures that the gaze probability density heat map 270 is a valid probability distribution.

When training the machine learning models, several terms are incorporated with the loss function. As the goal of the model is for the gaze probability density heat map, $P_G$, to predict a subject gaze as accurately as possible, the following data term is implemented to encourage the result:

$$\mathcal{L}_G = -\Sigma_t \Sigma_{x \in X_G(t)} \log P_G(x,t),$$

where $X_G(t)$ are the 2D ground truth gaze points at time t. A supervisory term for perceived awareness is also included. This term surrogates awareness estimation training by a perceived awareness estimation. One approach to do this is to provide a person with the gaze estimation of the driver overlaid on the road scene and query how aware the driver is of specific locations in the image at particular points in time. This is further described with reference to FIGS. 6A-6C. The cost term for perceive awareness is:

$$\mathcal{L}_{ATT} = \Sigma_{(x,t) \in labeled}(M_A(x,t) - L_A(x,t))^2,$$

where the summation is over all annotated samples in location x, at time t, and $L_A$ denotes the annotated measure of awareness in the range of [0, 1] as described in more detail with reference to FIGS. 6A-6C.

Figure 6A:
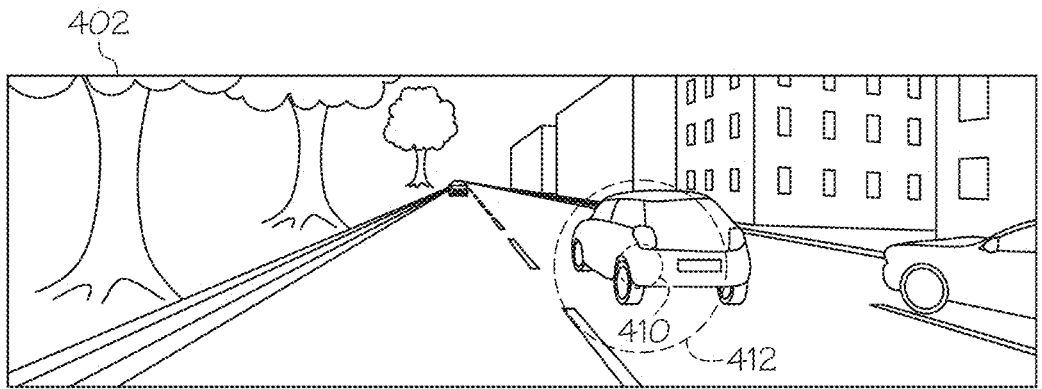
FIG. 6A depicts a first annotated image frame of an environment in a sequence of image frames, according to one or more embodiments shown and described herein.
Figure 6B:
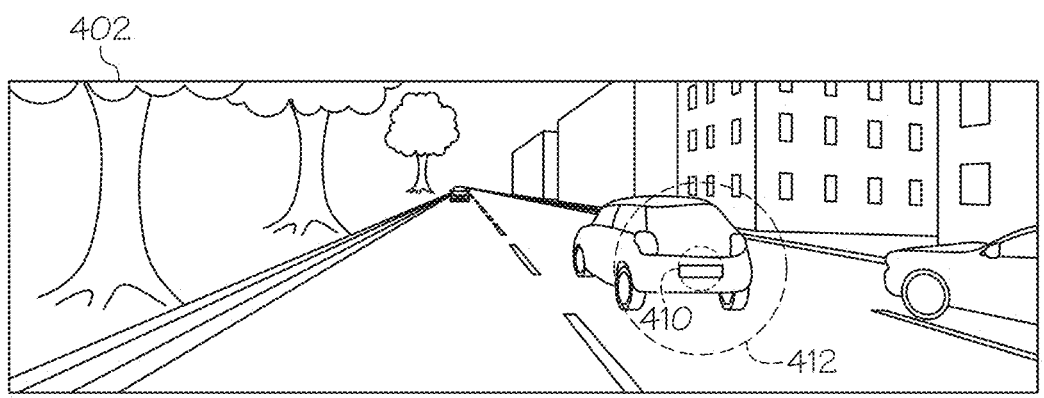
FIG. 6B depicts a second annotated image frame of an environment in a sequence of image frames, according to one or more embodiments shown and described herein.
Figure 6C:
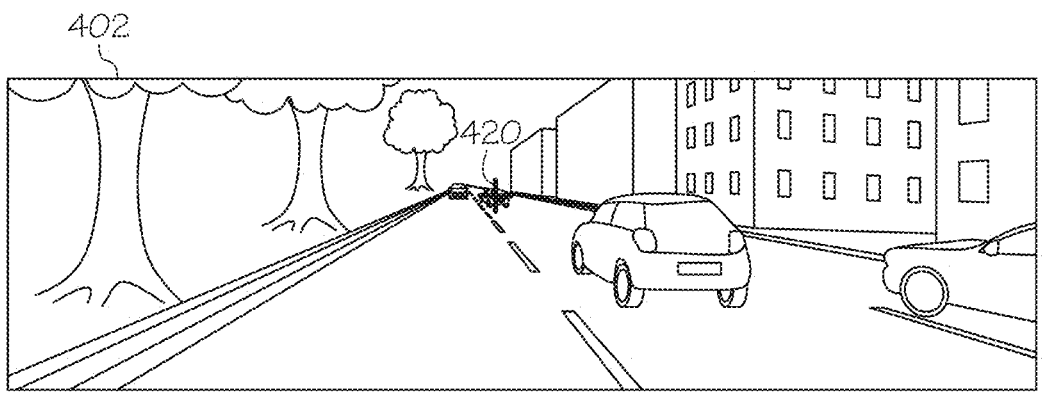
FIG. 6C depicts a final image frame of an environment in the sequence of image frames, according to one or more embodiments shown and described herein.

Referring to FIGS. 6A-6C, illustrative annotated image frames of an environment are depicted. For training the machine learning model 200, 10 second sample videos (e.g., image data 202) were annotated by annotators. The annotators watched a video snippet where the subject's gaze was marked by two circles 410 and 412. A first circle 410 was set to the diameter of a subject's central foveal vision area at the viewing distance. A second circle was set to a diameter twice the foveal vision circle. At the end of the video snippet, a specified location 420 was chosen and the annotators were asked whether they believe the subject has attended to that location on a scale between 1 and 5 (1=no, definitely not aware, 5=yes, definitely aware). The annotations were linearly transformed to [0,1] in $L_A$ and provided a supervisory signal that the network (awareness predictor) tried to match.

FIGS. 6A-6B depict two example frames from the video snippet. The two circles 410 and 412 are depicted in the frames shown in FIGS. 6A and 6B. It should be understood that these frames and the gaze locations are only a sample of the numerous gaze locations (e.g., the gaze sequence that is tracked) during the duration of the video snippet. The frame depicted in FIG. 6C illustrates a final frame shown to an annotator and asked whether, based on the observed circles 410 and 412 throughout the snippet, the subject attended to the specified location 420.

Referring back to FIG. 4 and the assumptions that informed the loss terms of the loss function for the model, in view of the assumption that attended awareness arises from objects that a subject looks at the following term is added to encourage awareness to be set to a high level when a subject is gazing at a scene location:

$$\mathcal{L}_{AA} = \Sigma_t \Sigma_{x \in X_G(t)}(M_A(x,t) - 1)^2.$$

In addition to supervisory terms, regularization terms are also incorporated in the model. In some embodiments, regularity terms for spatial smoothness are added to both the gaze probability density heat map 270, ($P_G$), and the attended awareness heat map 280, ($M_A$). The term is as follows:

$$\mathcal{L}_S = \int \frac{|\nabla_\phi|^2}{\sqrt{|\nabla I|^2 + \epsilon}} dx,$$

where $\phi$ is $M_A$, $P_G$ for $\mathcal{L}_{S,A}$, $\mathcal{L}_{S,G}$, respectively and I is the scene image. A temporal smoothness is also applied for the attended awareness.

In order to make the heat map temporally consistent with respect to the locations and not just object boundaries, a smoothness/decay term based on the image optical flow is used. The regularization term is:

$$\mathcal{L}_T = \sum_{x,t} f_{\epsilon_{OF}}(M_A(x, t), M_A(x + v_{OF}(x)m, t + 1)),$$

$$f_{\epsilon_{OF}}(a, b) = c_1((a - \epsilon_{OF}b)_+)^2 + c_2((a - \epsilon_{OF}b)_-)^2,$$

where $v_{OF}(x)$ is the optical flow computed on the input images (e.g., image data 202), and $\epsilon_{OF}$ is a weight factor.

In view of the assumption that awareness decays over time, the following term for modeling the decay is included:

$$\mathcal{L}_{DEC} = \Sigma_{x,t}((1-\epsilon_{DEC})M_A(x,t)-M_A(x,t+1))^2,$$

where $\epsilon_{DEC}$ is a decay factor. Additionally, one's visual working memory has a limited capacity and therefore it can be expected that the cognitive resources available to the subject do not change over time. This assumption captures the fact that the overall awareness should be similar between frames on average. The following term is included to model this assumption:

$$\mathcal{L}_{CAP} = \Sigma_t(\Sigma_x M_A(x,t)-\Sigma_x M_A(x,t+1))^2.$$

Finally, since the emitted awareness and gaze prediction is generated based on the training snippet started at time $t_1$, a consistency term between consecutive estimates is modeled via the following loss term:

$$\mathcal{L}_{CON} = \Sigma_{t_1,}\Sigma_x(\phi(x,t;t_1)-\phi(x,t;t_1+1))^2,$$

where $\phi$ is $M_A$, $P_G$ for $\mathcal{L}_{CON,A}$, $\mathcal{L}_{CON,G}$, respectively.

The overall training loss (e.g., the loss function) is a linear combination of the previously described loss terms.

The outputs of the machine learning model 200 are heat maps. The heat maps include attended awareness heat maps 280, gaze probability density heat maps 270, and, in some embodiments, a saliency heat map 290. The attended awareness heat maps 280 provide an estimate of the subject's awareness to salient regions in the environment. The attended awareness heat map 280 depicts estimated levels of awareness of the subject corresponding to locations within the environment. The gaze probability density heat map 270 provides a clean estimate of the noisy gaze input. It should be understood that the output of the machine learning model 200 may include one attended awareness heat map 280 and one gaze probability density heat map 270 or a series of heat maps output over time as image data such as a video stream and corresponding gaze sequences are analyzed. Additionally, in some embodiments, one attended awareness heat map 280 and one gaze probability density heat map 270 may provide estimates as to the gaze and awareness for a predefined period of time, for example a segment of video of an environment.

Figure 5:
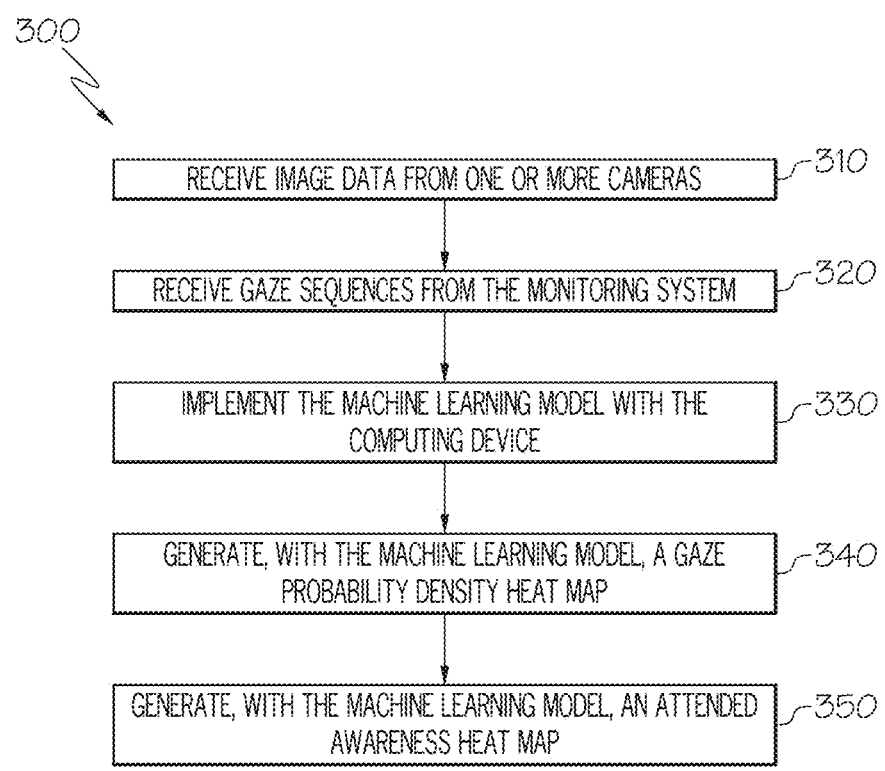
FIG. 5 depicts an illustrative flow diagram of a method for estimating the attended awareness of a subject with respect an environment, according to one or more embodiments shown and described herein.

Referring to FIG. 5 an illustrative flow diagram for a method 300 may be executed by the system 100 described herein. For example, the computing device 130 may be communicatively coupled to one or more cameras 140 and a monitoring system 138 that provides image data 202 and gaze sequences 204 to the computing device 130. At block 310, the computing device 130 receives image data 202 from one or more cameras 140 configured to capture scenes of an environment. At block 320, the computing device 130 further receives gaze sequences 204 from the monitoring system 138 configured to generate gaze sequences of an observed subject 205. The received image data 202 and gaze sequences 204 may be directly processed by the computing device 130 or stored in the memory component 134 for processing at a future time.

At block 330, the computing device 130 implements the machine learning model 200. Implementation of the machine learning model 200 may include loading the executable code and the trained model parameters associated with the machine learning model 200. Additionally, implementation of the machine learning model 200 may include receiving and/or updating weights or other parameters within the model before processing the image data 202 and the gaze sequences 204. The computing device 130, via execution of the convolutional encoder-decoder neural network 210, generates a latent map 250. The convolutional encoder-decoder neural network 210 is configured to determine visual saliency (e.g., generate a saliency heat map) of the environment from the image data 202 and fuse the visual saliency of the environment with the gaze sequences 204 to generate the gaze probability density heat map 270.

The process of fusing the visual saliency of the environment with the gaze sequences reduces noise in the gaze sequences generated by the monitoring system such that the gaze probability density heat map provides a more accurate estimation of a gaze of the subject than the gaze sequences generated by the monitoring system. In some embodiments, the process of denoising (e.g., reducing the noise) in the gaze sequences is accomplished by leveraging the scene saliency information as encoded by the network. As a result, fusing the noisy gaze locations with the visual saliency surpasses the capability of a saliency-based model, which merely finds saliency image peaks that are close to the noisy gaze location. That is, by fusing (combining) the visual saliency determined from image data of an environment with the gaze locations from the gaze sequences, the machine learning model 200 is able to correct imprecise gaze locations and thereby remove noise from the gaze sequence signals.

The model may be configured to assume that salient locations near a gaze location in the gaze sequence is the location that the subject it focused on (e.g., gazing at) rather than in the regions around the salient regions which may be the result of noise in the signal. In other words, the knowledge of where a subject could look next based on the features of the scene (image saliency) can help in the refinement of noisy and biased (miscalibrated) coarse estimates. For example, FIGS. 7A and 7B depict an illustrative example of two gaze probability density heat maps overlaid with the image data of an environment.

Figure 7A:
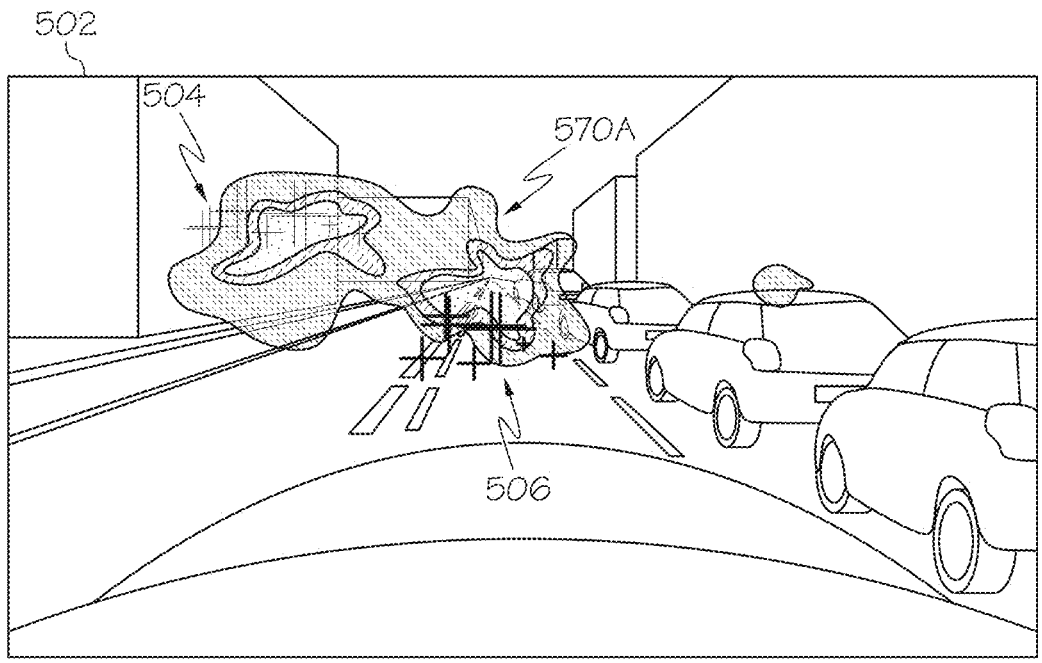
FIG. 7A depicts an illustrative example of a miscalibrated gaze probability density heat maps overlaid with the image data of an environment, according to one or more embodiments shown and described herein.
Figure 7B:
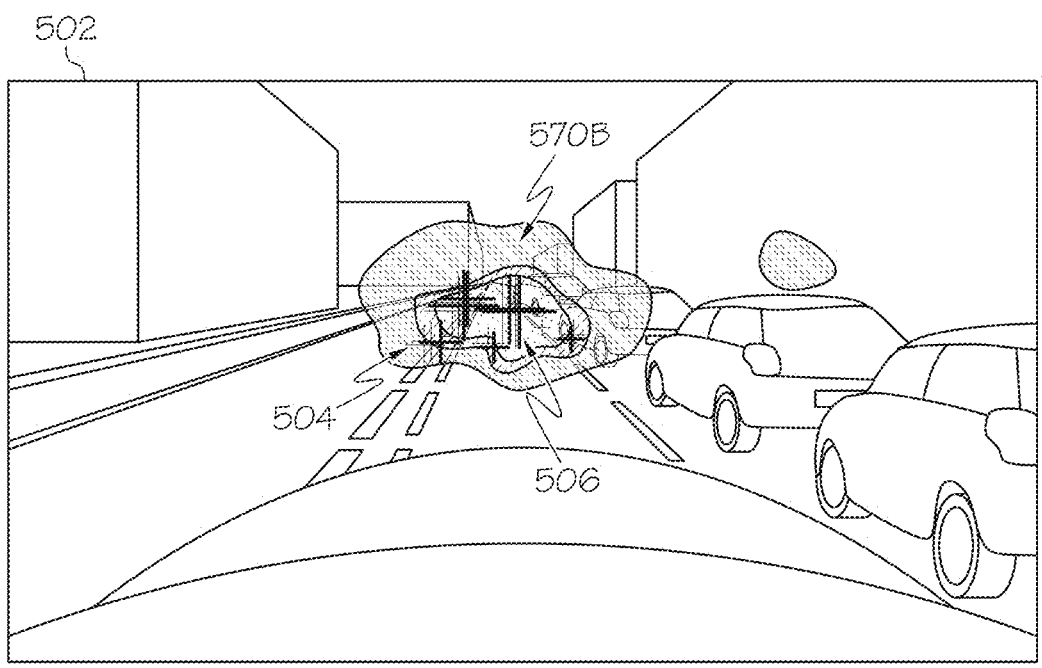
FIG. 7B depicts an illustrative example of a calibrated gaze probability density heat maps overlaid with the image data of an environment, according to one or more embodiments shown and described herein.

As depicted in FIG. 7A, there is a miscalibration between the gaze sequence indicated by the lightweight "+" 504 and the ground truth gaze indicated by the bold "+" 506. As a result, the gaze probability density heat map 570A is stretched and includes two separate high-density locations indicating that there is a miscalibration. Through a calibration process, which may include using the visual saliency of the environment to indicate where the subject is likely looking based on saliency, the machine learning model 200 can learn to correct the gaze calibration. For example, as depicted in FIG. 7B, the gaze sequence obtained from the monitoring system as indicated by the light weight "+" 504 and the ground truth gaze indicated by the bold "+" 506 are better aligned, more specifically, better aligned with the ground truth gaze locations 506.

Referring back to FIG. 5, at block 340, the computing device 130 retrieves a copy of the latent map 250 and, with one of the two or more convolutional modules 260A, generates a gaze probability density heat map 270. Similarly, the computing device 130 retrieves a copy of the latent map 250 and, with one of the two or more convolutional modules 260B, generates an attended awareness heat map 280 at block 350. The generated heat maps 270 and 280 may be stored in memory component 134 or the data storage component 150 for use by the system at a future time or may be further utilized to support the functionality of an autonomous or semi-autonomous driving system.

In some embodiments, the computing device 130, through implementation of the machine learning model 200, generates a visual saliency heat map 290 of the environment. The computing device 103 may be further configured to determine whether the subject is aware of salient regions in the environment defined by the visual saliency heat map based on a comparison of the gaze probability density heat map and the visual saliency heat map 290. For example, when a salient region aligns with a portion of the attended awareness heat map indicating a high likelihood (e.g., a level of awareness greater than a predetermined threshold) that the subject is aware of the region of the environment, then the computing device 130 may indicate that the subject is aware of the particular salient location. Such an application may be important in determining whether control of a vehicle can be transferred from an autonomous or semi-autonomous state to the driver. Before the aforementioned hand-off can occur, the computing device 130 of the vehicle may need to determine whether the driver is sufficiently aware of the environment and more specifically, for example, salient locations such as construction zones, crossing traffic, brake lights from a leading vehicle, or the like.

Figures 1, 8A:
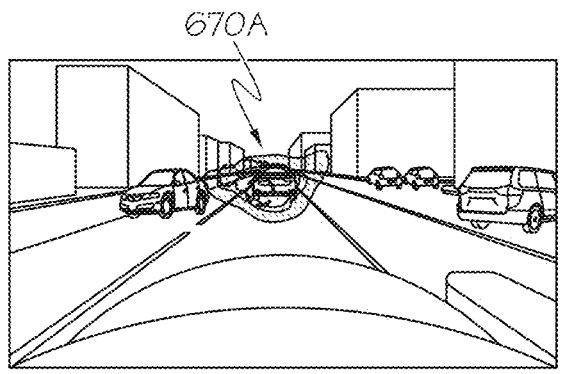
Figures 2, 8A:
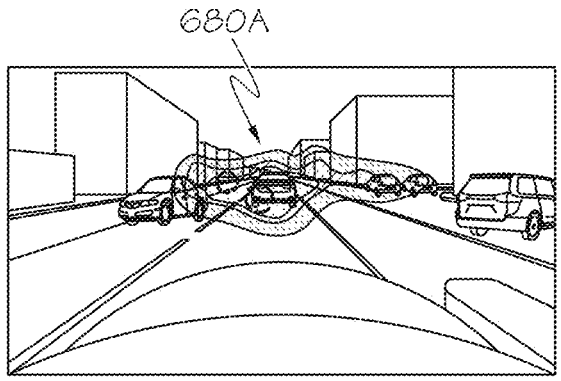
Figures 1, 8B:
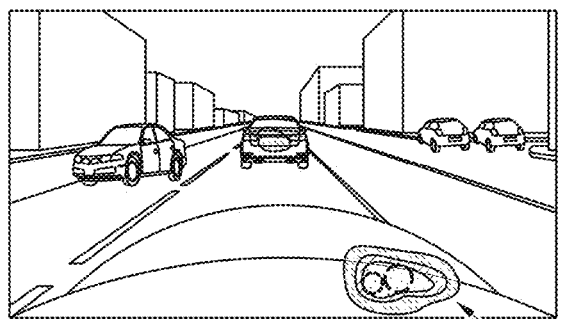
Figures 2, 8B:
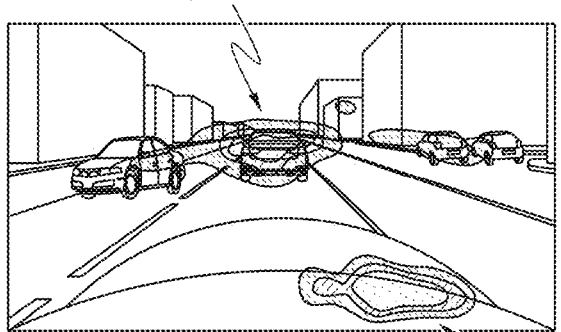
Figures 1, 8C:
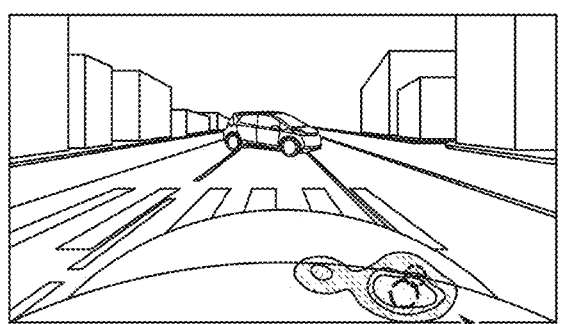
Figures 2, 8C:
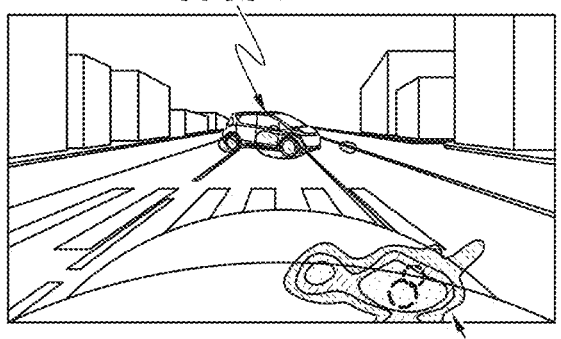

As discussed above, modeling and measuring a subject attended awareness of an environment needs to be constrained by some natural limitations. For example, the capacity for a subject to be aware of a number of salient locations within an environment may be limited in capacity. Additionally, as time passes between focused gazes on a salient region within an environment, the awareness of the region within the environment decays. FIGS. 8A-1, 8A-2, 8B-1, 8B-2, 8C-1, and 8C-2 illustrate the time evolution of gaze and awareness over a sequence of frames of an environment. FIGS. 8A-1, 8B-1, and 8C-1, when viewed in order, depict the change in a subject's gaze over time, for example, as the driver of the vehicle goes from looking out and down the road (FIG. 8A-1) to reading a message on a display screen in the vehicle (FIG. 8C-1). That is, the depicted gaze probability distribution heat map 670A depicted in FIG. 8A-1 shifts to a bifurcated heat map 670B depicted in FIG. 8B-1 to a heat map 670C concentrated away from the roadway, as depicted in FIG. 8C-1.

Similarly, FIGS. 8A-2, 8B-2, and 8C-2, when viewed in order, depict the change in a subject's attended awareness of the roadway as the gaze depicted in FIGS. 8A-1, 8B-1, and 8C-1 shifts from looking out and down the road to reading a message on a display screen in the vehicle. As depicted, for example, the attended awareness depicted by heat map 680A in FIG. 8A-2 changes to a bifurcated heat map 680B-1 and 680B-2 in FIG. 8B-2 as the gaze of the driver shifts to a display screen in the vehicle. It is noted that the attended awareness heat map does not change as quickly as the heat map of the gaze because there is a memory component associated with attended awareness. That is, a subject may continue to recall (e.g., have an awareness) about a region in the environment for a period of time. However, the level of awareness and/or the period of time associated with the awareness is increased or decreased as a function a variety of factors. For example, a subject's capacity to recall information may increase or decrease the period of time associated with the decay weight.

Similarly, if the subject is moving or the salient feature in the environment is moving, the locations of each may be changing at a rate that increases or decreases the period of time that a subject would be aware. Additionally, other factors such as weather, traffic, or the task the subject is engaged in may increase or decrease the decay weighting associated with the attended awareness for a subject. For example, viewing FIGS. 8C-1 and 8C-2, the gaze heat map 670C is completely concentrated in the lower portion of the environment whereas a portion, albeit a small, reduced portion of the attended awareness heat map 680C-1 remains along the road in the environment depicted. The attended awareness heat map 680C-1 depicted in FIG. 8C-2 may rapidly disappear because a new salient event occurred in the region previously gaze upon by the subject. That is, a vehicle is turning across the subject's lane of travel and there is no gaze sequence indicating that the subject is or was aware of the turning vehicle's position, motion, or intent to turn. Accordingly, over time, the strength (e.g., level of awareness) indicated by the heat map decreases unless the subject subsequently gazes upon the region of the environment periodically.

Embodiments described and shown herein introduce a new machine learning model that can use imperfect gaze information and visual saliency to reason about perceived attended awareness. The model is based on 3D convolutions, but is not limited thereto. Additionally, the model is designed to convolve image data including video snippets or sequences of images. Moreover, the generation of attended awareness heat maps and gaze probability density heat maps provide valuable datasets for human interfacing systems such as those implemented in vehicles, robots, mobile devices, and digital personal assistants.

It is now understood that systems and methods disclosed herein include a camera configured to capture image data of an environment, a monitoring system configured to generate a gaze sequences of a subject, and a computing device communicatively coupled to the camera and monitoring system. The computing device is configured to receive image data from the camera and gaze sequences from the monitoring system, implement a machine learning model comprising a convolutional encoder-decoder neural network configured to process the image data and a side-channel configured to inject gaze sequences into a decoder stage of the convolutional encoder-decoder neural network, generate, with the machine learning model, a gaze probability density heat map, and generate, with the machine learning model, an attended awareness heat map.

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system, comprising:
a camera configured to capture image data of an environment;
a monitoring system configured to generate a gaze sequences of a subject; and
a computing device communicatively coupled to the camera and the monitoring system, the computing device configured to:
receive the image data from the camera and the gaze sequences from the monitoring system,
implement a machine learning model comprising a convolutional encoder-decoder neural network configured to process the image data and a side-channel configured to inject the gaze sequences into a decoder stage of the convolutional encoder-decoder neural network,
generate, with the machine learning model, a gaze probability density heat map, and
generate, with the machine learning model, an attended awareness heat map.

2. The system of claim 1, wherein the machine learning model is configured to determine visual saliency of the environment from the image data and fuse the visual saliency of the environment with the gaze sequences to generate the gaze probability density heat map.

3. The system of claim 2, wherein fusing the visual saliency of the environment with the gaze sequences reduces noise in the gaze sequences generated by the monitoring system such that the gaze probability density heat map provides a more accurate estimation of a gaze of the subject than the gaze sequences generated by the monitoring system.

4. The system of claim 1, wherein the attended awareness heat map estimates levels of awareness of the subject corresponding to locations within the environment.

5. The system of claim 1, wherein:
the image data received by the computing device is a video sequence spanning a period of time, and
the gaze sequences received by the computing device span the period of time.

6. The system of claim 5, wherein the gaze probability density heat map provides an estimate of a gaze of the subject over the period of time.

7. The system of claim 5, wherein the attended awareness heat map provides an overall level of awareness to locations within the environment at an end of the period of time.

8. The system of claim 1, wherein the computing device is further configured to:
generate a visual saliency heat map of the environment, with the machine learning model, and
determine whether the subject is aware of salient regions in the environment defined by the visual saliency heat map based on a comparison of the gaze probability density heat map and the visual saliency heat map.

9. The system of claim 1, wherein the machine learning model further comprises a first convolutional model and a second convolutional model configured to receive a latent map generated by the convolutional encoder-decoder neural network,
the first convolutional model generates the gaze probability density heat map, and
the second convolutional model generates the attended awareness heat map.

10. The system of claim 9, wherein the second convolutional model includes a decay factor causing estimated levels of awareness defined in the attended awareness heat map to decay over time.

11. The system of claim 1, wherein:
the decoder stage comprises a plurality of decoder units,
at least one decoder unit of the plurality of decoder units is configured to receive input from the side-channel corresponding to the at least one decoder unit and an output from a previous decoder unit of the plurality of decoder units, and
the at least one decoder unit is configured to concatenate the side-channel corresponding to the at least one decoder unit with the output from the previous decoder unit.

12. A method, comprising:
receiving image data of an environment from a camera and gaze sequences of a subject from a monitoring system;
implementing, with a computing device, a machine learning model comprising a convolutional encoder-decoder neural network configured to process the image data and a side-channel configured to inject the gaze sequences into a decoder stage of the convolutional encoder-decoder neural network;
generating, with the machine learning model, a gaze probability density heat map; and
generating, with the machine learning model, an attended awareness heat map.

13. The method of claim 12, further comprising:
determining, with the machine learning model, visual saliency of the environment from the image data; and
fusing the visual saliency of the environment with the gaze sequences to generate the gaze probability density heat map.

14. The method of claim 13, wherein fusing the visual saliency of the environment with the gaze sequences reduces noise in the gaze sequences generated by the monitoring system such that the gaze probability density heat map provides a more accurate estimation of a gaze of the subject than the gaze sequences generated by the monitoring system.

15. The method of claim 12, wherein the attended awareness heat map estimates levels of awareness of the subject corresponding to locations within the environment.

16. The method of claim 12, wherein:
the image data received by the computing device is a video sequence spanning a period of time, and
the gaze sequences received by the computing device span the period of time.

17. The method of claim 16, wherein the gaze probability density heat map provides an estimate of a gaze of the subject over the period of time and the attended awareness heat map provides an overall level of awareness to locations within the environment at an end of the period of time.

18. The method of claim 12, further comprising:
generating a visual saliency heat map of the environment, with the machine learning model, and
determining whether the subject is aware of salient regions in the environment defined by the visual saliency heat map based on a comparison of the gaze probability density heat map and the visual saliency heat map.

19. The method of claim 12, wherein the machine learning model further comprises a first convolutional model and a second convolutional model configured to receive a latent map generated by the convolutional encoder-decoder neural network,
the first convolutional model generates the gaze probability density heat map, and
the second convolutional model generates the attended awareness heat map.

20. A vehicle, comprising:
a camera configured to capture image data of an environment around the vehicle;
a monitoring system configured to generate a gaze sequences of a driver; and
a computing device communicatively coupled to the camera and the monitoring system, the computing device configured to:
receive the image data from the camera and the gaze sequences from the monitoring system,
implement a machine learning model comprising a convolutional encoder-decoder neural network configured to process the image data and a side-channel configured to inject the gaze sequences into a decoder stage of the convolutional encoder-decoder neural network,
generate, with the machine learning model, a gaze probability density heat map, and
generate, with the machine learning model, an attended awareness heat map.

\* \* \* \* \*

UNITED STATES PATENT AND TRADEMARK OFFICE
CERTIFICATE OF CORRECTION

| | | |
|---|---|---|
| PATENT NO. | : 11,999,356 B2 | Page 1 of 1 |
| APPLICATION NO. | : 17/351611 | |
| DATED | : June 4, 2024 | |
| INVENTOR(S) | : Guy Rosman et al. | |

It is certified that error appears in the above-identified patent and that said Letters Patent is hereby corrected as shown below:

On the Title Page

Item (72), inventor 6, city, delete "Nisshin" and insert --Nisshin-shi--, therefor.

In the Specification

In Column 9, Line(s) 22, delete "Boltzman" and insert --Boltzmann--, therefor.

Signed and Sealed this
Eighteenth Day of March, 2025

Coke Morgan Stewart
*Acting Director of the United States Patent and Trademark Office*